Oct. 10, 1967
M. ROUANET
3,346,212
FISHING REEL
Filed May 7, 1965
2 Sheets-Sheet 1
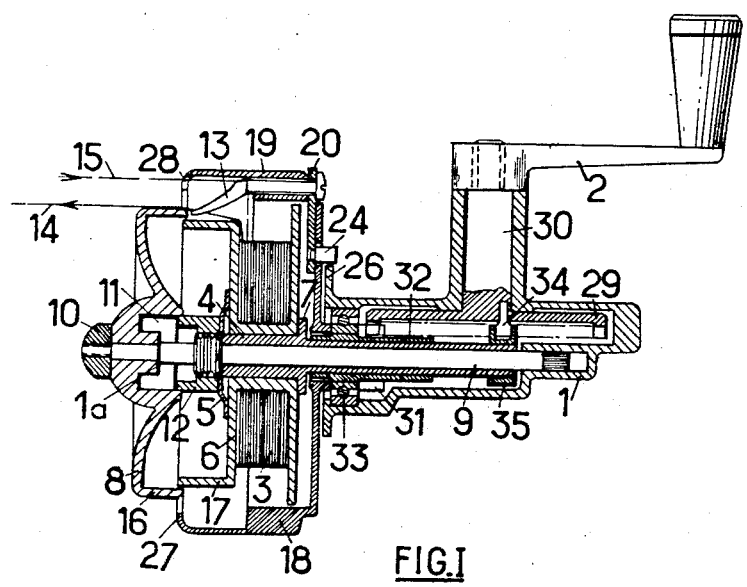
FIG. I
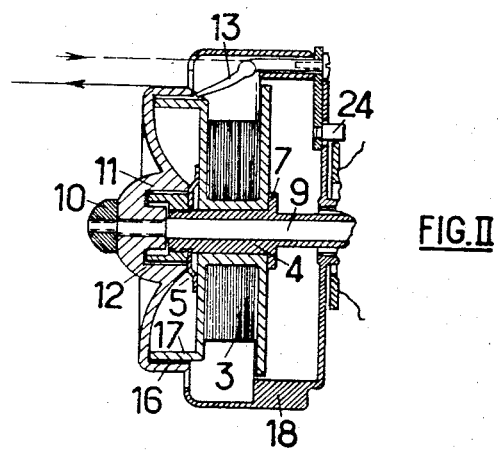
FIG. II Oct. 10, 1967  M. ROUANET  3,346,212
FISHING REEL
Filed May 7, 1965  2 Sheets-Sheet 2
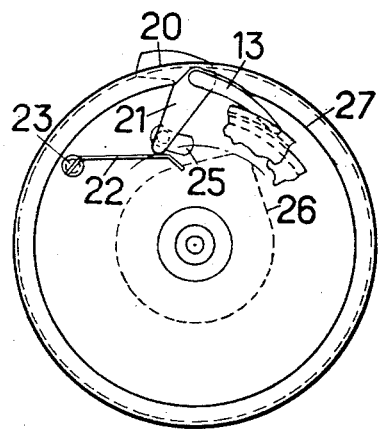
FIG. III
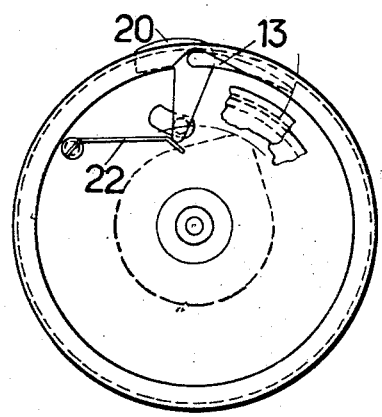
FIG. IV
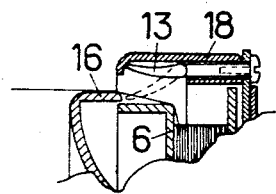
FIG. V
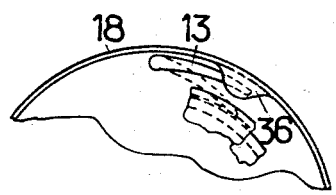
FIG. VI 3,346,212
FISHING REEL
Michel Rouanet, 27 Rue des Girondins,
Saint-Cloud, France
Filed May 7, 1965, Ser. No. 467,799
14 Claims. (Cl. 242—84.21)

The present invention relates to fishing reels and more particularly to reels which operate as a spinning reel yet have a closed face.

This is a continuation-in-part of my prior application Serial Number 212,599, filed July 26, 1962, now abandoned.

The reel is of the type in which the spool is surrounded by a front housing and a rear housing in the manner described and illustrated in French Patent Number 958,408, issued December 5, 1947.

The reel of the present invention represents a new embodiment of the reel of the above mentioned type and presents a certain number of improvements concerning the guiding and the connecting of the fishing line, as well as the usual brake member which stops the spool during the winding of the line, but which allows the line to turn and yield in the case of an excessive pull on the line by the fish.

Prior art closed face type spinning reels have the fishing line entering through the center of the cover, and have no means incorporated with the cover to actuate the brake.

Other prior art spinning reels have no means to cover the line from the elements.

An object of the instant invention is to provide a device which meets the disadvantages of the prior art.

Another object is to provide a cap which will not only protect the line and beautify the assembly, but will also provide means to control the brake.

One of the improvements provided by the present invention consists in the control of the conventional brake member. Generally, such a conventional brake member is controlled by a button located in front of the reel, the diameter of which is less than the diameter of the spool. According to the invention, the diameter of such control member is made larger than the diameter of the delivery side of the spool and reaches the dimensions of the opened face of the usual cup or bell shaped member encircling the spool. An advantage of the enlarged control member is that it may be gripped easily and it permits more substantial precision of the brake control.

Another object of the invention is to take advantage of such an enlarged cover member to obtain a reel of the closed face type, by means of the cooperation of the cover member with the conventional cup member encircling the spool, except for a narrow annular aperture to let the line escape peripherally around the cover. Thus, the open face of the cup member is practically closed by a cover to the same extent as in the known closed face type reels in which the line escapes centrally by an aperture at the center of a cover closing the open face of the cup member, with the advantage of dispensing the line to form a double bent path.

A further object is to provide a cover of such a shape and configuration that it will be advantageously employed as a line guide, in the sense that it determines the position of the line in order that the latter may be gathered or reeled in easily and in a dependable manner by the line pickup. By guiding the line peripherially, and not centrally of the cap, all chance of twisting of the line will be prevented.

One of the improvements provided by the present invention consists in the control of the brake member which is operated in the usual manner by a button located in front of the reel, but in this case the dimensions, and particularly the diameter of this member, are made much larger and approach the dimensions of the usual cap or cover member with which it forms a unitary structure. Thus, the enlarged button may be gripped easily and permits a much more substantial precision in the brake controlling.

Another object is to provide a cover which closes the open face of the cup whereby the bobbin is substantially enclosed in the cup at all times, regardless of the position of the line.

The invention will be explained hereafter by means of an example, but without the intention of limiting the generic scope of the various improvements to the specific details of the example chose for the purpose of illustration.

In the drawing:

FIGURE 1 is an axial section of a reel according to the invention showing the spool in the retracted position.

FIGURE 2 is a partial illustration of FIGURE 1 to show the spool located in the forward position.

FIGURE 3 and FIGURE 4 are partial front views, showing respectively the line pick-up in the position of operation and in the retracted position.

FIGURES 5 and 6 show a modification in the retracted position of the line pick-up; FIGURE 5 showing a partial axial section while FIGURE 6 is a partial front view.

Referring now to the drawings, numeral 1 designates the main housing which contains the mechanism and which is secured to the fishing rod by the usual means not shown. The usual handle 2 is arranged so that its axis of rotation is perpendicular to the axis of spool 3. Spool 3 is mounted on a hollow shaft 4, and is adapted to rotate relative to this shaft. The spool may be stopped or immobilized on the shaft by the usual brake member which consists, in this case, of a spring 5 in the form of a blade or dish which bears against the front disc of the spool and presses the latter against shoulder 7 of the spool support shaft 4.

For the purpose of controlling the brake member, a cap 8 is mounted loosely on a main shaft 9 of the reel, this shaft 9 being mounted in a fixed manner in housing 1. The cap or cover 8 is stopped in its movement on shaft 9 toward the right by means of a shoulder 1a on the shaft and toward the left by means of a screw 10 which is screwed on the threaded end of shaft 9.

The cap 8, which has the form of a bell, presents on its inner face a recess 11 of a polygonal inner form, for example of a hexagonal form, in which a screw 12 may slide freely, screw 12 having an outer configuration which corresponds to the inner configuration of recess 11. This screw is turned onto the threaded extremity of hollow shaft 4 which is mounted on the main stationary shaft 9 and on which it is adapted to slide freely.

The depth of the recess 11 is sufficient to permit the movement of the hollow shaft 4 between the extreme limits of its displacement on shaft 9 without permitting screw 12 to leave this recess. Screw 12 bears normally against the brake spring 5.

The operation of the elements described is as following: the cap 8 is easily gripped with the fingers and rotated; the rotation of cap 8 causes the movement of screw 12 in one or the other direction and modifies thereby the pressure which spring 5 exerts against the front disc 6 of the spool. Cap 8 constitutes a control member of the brake whose diameter is five to ten times larger than the usual control buttons and provides thus a much greater precision in the adjustment.

The cap 8 is also employed as a line-guide, in the sense that it determines the position of the line in order that the latter may be gathered or reeled in easily and in a dependable manner by the line pick-up 13. The line being guided peripherally, and not centrally by the cap, thus preventing the twisting of the line.

In FIGURE 1, the line is shown in two positions: position 14 is the unwinding or pay-off position, the figure showing the engagement of the line by the point of the line-pickup 13; and the position 15 in dotted lines, in the winding or reeling-in position in which the line is sliding along the base of the pick-up. This sliding position may be determined by the usual notch which is not visible on the figures and which is cut into the surface of the base of the pick-up so that the line may slide in this notch while the spool is being wound up. The slot which serves as a line guide may be replaced by the usual roller in a manner well known in the art.

As may be seen in position 14 in the line, this position is accurately determined by the border or ring 16 of cap 8 on the one hand and by the border of the front disc 6 of the spool on the other hand, so that one may determine the length the finger 13 which constitutes the pick-up in order that the interception or catching of the line is made certain.

In the present example, the difference of the diameter of cap 8 and of disc 6 imparts to the line in the intercepting area an oblique position which is particularly favorable. This arrangement makes it possible to provide the spool with a forwardly extending skirt 17 which has the advantage of covering the space which would exist between the spool. The line will thus be prevented from being tangled or fouled.

The distance from the distal extremity of the pick-up in the reeling-in position to the axis of rotation of the shaft is greater than the radius of the delivery side of the spool and lesser than the radius of the cover.

According to another improvement, the pick-up 13, carried by the rear housing or flyer 18, is lodged on the inside of this flyer which has the form of a bell. This arrangement of the pick-up prevents it from projecting outwardly of the flyer and eliminates any possibility that the line may be caught during an accidental looping or snarling. The pick-up 13 may pivot around its shaft 19, mounted in a sleeve against the inner wall of the plate of the flyer. The shaft 19 carries a knee-lever which has an arm 20 that traverses the wall of the flyer through a slot and through which it projects in the operating position of the pick-up (FIGURE 3) or is withdrawn in the retracted position of the pick-up (FIGURE 4).

The other arm 21 of the knee-lever bears against a spring 22 which is bent and which is fixed to the flyer by means of a screw 23. This spring urges the pick-up into its two extreme positions and maintains it in such position.

The arm 21 has a spur 24 which passes through a slot 25 provided in the rear wall of the flyer, and the dimensions of the slot may be so chosen as to limit thereby the movement of arm 21. The displacement of the spur 24 is controlled by means of a cam 26 which is fixed relative to the housing 1.

The profile of this cam is such that it causes the tilting of the arm 21 when the latter is in the position of FIGURE 4 so that the flyer will rotate clockwise as seen in FIGURES 3 and 4 in the reeling-in direction.

According to one of the features of the invention, when the pick-up 13 is in the position where it must allow the free unwinding of the line, it is completely retracted (FIGURE 4) or at least its point is withdrawing (FIGURES 5 and 6) in such a manner as to prevent any possibility of picking up or catching the line.

In FIGURE 4, the pick-up is completely hidden by the flange 27 which is turned inwardly at a 90° angle and which constitutes virtually a cover.

In this flange a slot may be provided at 28 to the right of the line guide opening so as to avoid the wear of the line due to friction.

In FIGURES 5 and 6 the finger which constitutes the line pick-up 13 is no longer hidden by the flange of the flyer; this flange has been eliminated but the point of the line pick-up is hidden in the retracted position by a projection 36 of the external face of the wall of flyer 18, this projection being preferably given a rounded configuration.

The transmission of the movement of the handle 2 is obtained by the crown gear 29 which is keyed on shaft 30 of the handle. This crown gear meshes with pinion 31 which is keyed on sleeve 32 on which the flyer 18 is keyed and in which the hollow shaft is mounted for rotation. The sleeve 32 is supported by and rotates in the ball bearing 33, the movement of the bearing being blocked between pinion 31 and the flyer.

The rotating movement of the crown gear 29 is transformed into an alternating linear movement of the hollow shaft 4 and thus of the spool 3 by means of the usual lug 34, carried by the crown gear 29, which moves in the slot of a ring 35 which is fixed to the hollow shaft 4.

The operation is as follows:

When the line pick-up is in the position of FIGURES 1–3, the rotation of the handle which causes flyer 18 to rotate in the winding-up direction, (as seen in FIGURES 3 and 4, that is to say, in the clockwise direction) does not have any effect on the line pick-up. This is because the spur 24 is not being subjected to the action of the fixed cam 26 (see FIGURE 3). In its rotating movement the line pick-up first allows the line to slide toward the opening at its base, then winds the line on the spool while the alternating linear movement of the latter assures in a known manner the proper distribution of the line.

In order to cast the line, the fisherman presses on the lever arm 20 and, by this action, the line pick-up 13 is retracted and the line may then unwind freely (see FIGURE 4).

In order to bring the line back for reeling it in the handle is rotated in the winding-in direction, that is to say, in the direction which causes the flyer 18 as seen in FIGURES 3 and 4, to rotate in the clock-wise direction. This causes the spur 24 to bear against the fixed cam and thereby causes the line pick-up to pivot and return into the position of FIGURES 1, 2 and 3; the continuation of the rotating movement assures the picking-up of the line and the reeling-in as described above.

While the invention has been described in connection with different embodiments thereof, it will be understood that it is capable of further modifications, and this application is intended to cover any variation, uses, or adaptations of the invention following, in general, the principles of the invention and including such departures from the present disclosure as come within known or customary practice in the art to which the invention pertains and as may be applied to the essential features hereinbefore set forth and fall within the scope of the invention or appended claims.

Having thus described my invention, what I claim is:
1. A fishing reel comprising:
  (a) a drive housing,
  (b) a stationary drive support fixed in said housing,
  (c) a line spool rotatably and reciprocally mounted on said drive support for delivery of a line over one side of said spool,
  (d) a flyer rotatably mounted on said drive support,
  (e) a line pick-up mounted on said flyer and movable from a reeling-in position to a casting position,
  (f) said pick-up engaging the line in the reeling-in position,
  (g) means for reciprocating said line spool,
  (h) said flyer having a cylindrical forwardly projecting flange forming an open face on the delivery side of said spool,
  (i) a front cover rotatably mounted immediately adjacent said open face, said cover cooperating with said projecting flange to close said open face at all times, said cover having a diameter slightly greater than the diameter of said delivery side of said spool, (j) said projecting flange encircling said spool and forming a recess of slightly greater diameter than the diameter of said cover, (k) brake means adapted to engage and hold said spool against rotation, (l) brake control means mounted for axial movement for varying the pressure of said brake means against said spool, (m) and means on said cover engaging said brake control means for axial movement thereof upon rotation of said cover.

2. A fishing reel as defined in claim 1 wherein said brake control means is a polygonal nut threadedly mounted on said support and wherein said cover has a corresponding polygonal recess for receiving said nut.

3. A fishing line reel as set forth in claim 1 wherein said cover has a rearwardly projecting cylindrical rim and said pick-up has a finger extending into close proximity of said cylindrical rim in the reeling-in position.

4. A fishing line reel as set forth in claim 3 wherein the forward extremity of said pick-up finger is movable from the casting position adjacent said flange of said flyer to a reeling-in position rearwardly of said rim of cover in spaced relationship thereto and slightly inwardly thereof.

5. A fishing line reel as set forth in claim 4, wherein said pick-up finger is disposed within said flange of said flyer and has an extended length less than the width of said flange.

6. A fishing line reel as set forth in claim 5 wherein said cylindrical flange on said flyer has a radially projecting rim adapted to cover said extremity of said pick-up finger in the casting position.

7. In a fishing line reel the combination as set forth in claim 6 wherein a lever is fixed to said line pick-up and movable with said pick-up finger, said lever having one arm adapted to extend through an opening in said flange of said flyer, said lever having another arm extending inwardly and adapted to engage a biasing spring fixed to said flyer, said other arm having a lug extending through an opening in the wall of said flyer, and cam means fixed to said housing for engaging said lug to move said pick-up into the casting and reeling-in positions.

8. A fishing line reel comprising:
(a) a drive housing,
(b) a stationary drive support spindle fixed in said housing,
(c) a hollow spool shaft rotatably mounted on said spindle,
(d) a line spool mounted on said spool shaft for delivery of a line over one side of said spool,
(e) a rotary sleeve mounted on said spool shaft,
(f) a flyer secured to said rotary sleeve and surrounding said spool,
(g) a line pick-up mounted on said flyer and movable from a reeling-in position to a casting position,
(h) said pick-up engaging the line in the reeling-in position,
(i) manually operable gear means connected to said rotary sleeve,
(j) means fixed to said gear means for reciprocating said spool shaft,
(k) said flyer having a cylindrical forwardly projecting flange and an open face on the delivery side of said spool,
(l) a front cover to close said open face and rotatably mounted axially of said spool shaft,
(m) said cover having an inwardly projecting cylindrical rim and said pick-up having a finger extending in close proximity with said cylindrical rim in the reeling-in position,
(n) the forward extremity of said pick-up finger being movable from the casting position adjacent said flange of said flyer to a reeling-in position rearwardly of said rim of said cover in spaced relationship thereto and slightly inwardly thereof,
(o) said cylindrical flange forming a recess of slightly greater diameter than the diameter of said cover,
(p) said brake means adapted to engage and hold said spool against rotation,
(q) brake control means including a polygonal nut threadedly mounted on said spool shaft cooperating with a corresponding polygonal recess in said cover, mounted for axial movement on said spool shaft to vary the pressure of said brake means against said spool,
(r) and means on said cover to engage said brake control means for axial movement thereof upon rotation of said cover.

9. A fishing reel comprising:
(a) a drive housing,
(b) a spool shaft having an axis of rotation mounted in said drive housing,
(c) a line spool rotatably mounted on said shaft for free delivery of the line from one side of said spool,
(d) a flyer mounted for rotation around said spool,
(e) said flyer having a cylindrical forwardly projecting flange encircling at least the delivery side of said spool and an open face on the delivery side of said spool,
(f) a front cover rotatably mounted immediately adjacent to said open face, cooperating with said projecting flange to close said open face, said cover having a diameter slightly greater than the diameter of the delivery side of the spool and mounted independently of said spool and axially of said flyer,
(g) said cylindrical flange forming a recess of slightly greater diameter than the diameter of said front cover,
(h) a line pick-up mounted on said flyer and movable from a reeling-in position to a casting position, the distance from the distal extremity of said pick-up in said reeling-in position to said axis of rotation of said shaft being greater than the radius of the delivery side of said spool and lesser than the radius of said cover,
(i) said pick-up engaging the line in the reeling in position,
(j) brake means for holding said spool against rotation,
(k) and brake adjusting means connected to said cover,
(l) means on said cover for actuating said brake adjusting means.

10. The combination defined in claim 9 in which said cover is provided with a rearwardly projecting cylindrical flange.

11. A fishing reel as set forth in claim 10 in which said line pick-up having an extremity movable from a casting position to a reeling-in position, the circular path of said extremity when in reeling-in position having a diameter slightly less than the diameter of the flange of said cover and being disposed slightly rearwardly in spaced relationship to said flange.

12. A fishing reel as set forth in claim 11 in which the spool is axially disposed between said flyer and said cover, said spool having a cylindrical flange projecting forwardly, the diameter of said spool flange being slightly less than the diameter of the flange of said cover.

13. A fishing reel comprising:
(a) a drive housing,
(b) a stationary drive support spindle fixed in said housing,
(c) a hollow spool shaft rotatably mounted on said spindle,
(d) a line spool mounted on said spool shaft for delivery of a line over one side of the spool,
(e) a rotary sleeve mounted on said spool shaft,
(f) a flyer secured to said rotary sleeve and surrounding said spool, (g) a line pick-up mounted on said flyer and movable from a reeling-in position to a casting position,
(h) said pick-up engaging the line in the reeling-in position,
(i) manually operable gear means connected to said rotary sleeve,
(j) means fixed to said gear means for reciprocating said spool shaft,
(k) said flyer having a cylindrical forwardly projecting flange and an open face on the delivery side of said spool,
(l) a front cover rotatably mounted immediately adjacent to said projecting flange to close said open face, said cover having a diameter slightly greater than the diameter of the delivery side of the spool and mounted independently of said spool and axially of said flyer,
(m) said cylindrical flange encircling said spool forming a recess of slightly greater than the diameter of said cover,
(n) brake means adapted to engage and hold said spool against rotation,
(o) brake control means mounted for axial movement on said spool shaft to vary the pressure of said brake means against said spool,
(p) and means on said cover to engage said brake control means for axial movement thereof upon rotation of said cover.
14. A fishing reel comprising:
(a) a flyer having a cylindrical forwardly projecting flange forming an open face,
(b) a spool having an axis of rotation rotatably mounted within said flyer for free delivery of line from one side of said spool,
(c) a front rotary cover having a diameter at least as large as the diameter of said spool and immediately adjacent said open face, cooperating with said projecting flange to close said open face at all times,
(d) a line pick-up mounted on said flyer and movable from a reeling-in position to a casting position, the distance from the distal extremity of said pick-up in said reeling-in position to said axis of rotation of spool being greater than the radius of the delivery side of said spool and lesser than the radius of said cover,
(e) brake means adapted to engage and hold said spool against rotation,
(f) means operatively connecting said cover to said brake means to actuate said brake means upon rotation of said cover.

References Cited
UNITED STATES PATENTS

| | | | |
|---|---|---|---|
| 2,344,209 | 3/1944 | Lowe | 242—84.21 X |
| 2,600,558 | 6/1952 | Mauborgne | 242—84.21 |
| 2,615,647 | 10/1952 | Palmer et al. | 242—84.21 |
| 2,705,113 | 3/1955 | Bonanno | 242—84.21 |
| 2,926,863 | 3/1960 | Mauborgne | 242—84.2 |
| 3,074,664 | 1/1963 | Beger | 242—84.2 |

FOREIGN PATENTS 958,408　9/1949　France.

FRANK J. COHEN, *Primary Examiner.*

B. S. TAYLOR, *Assistant Examiner.*